W. WRIGHT.
Machine for Boring Curved Cylinders.
No. 42,616. Patented May 3, 1864.
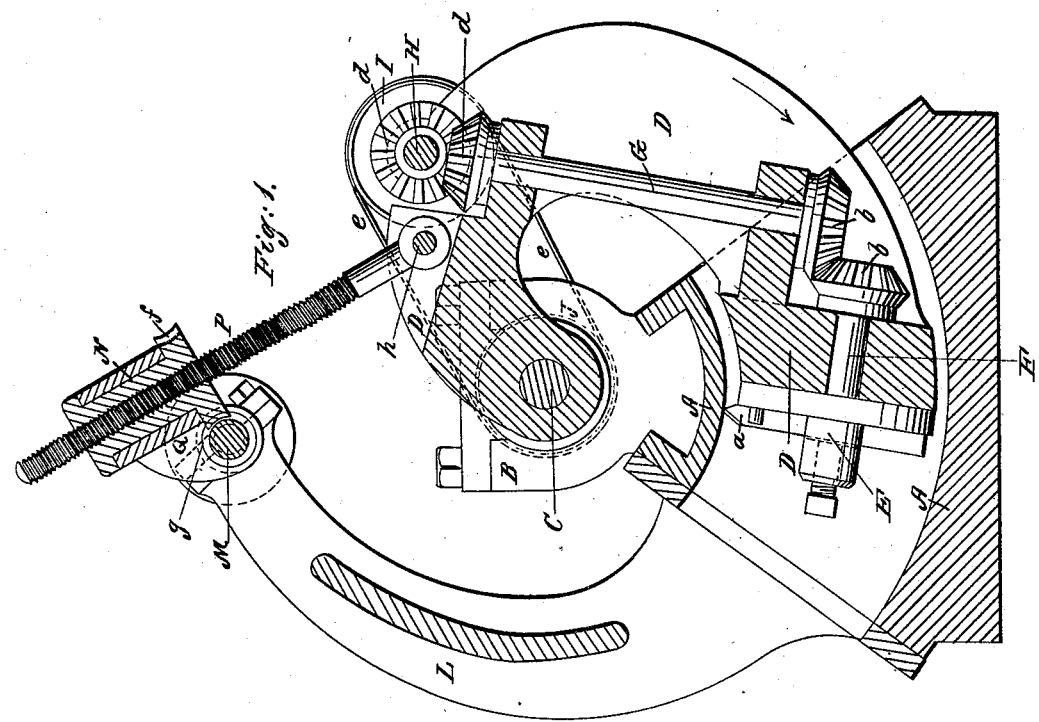
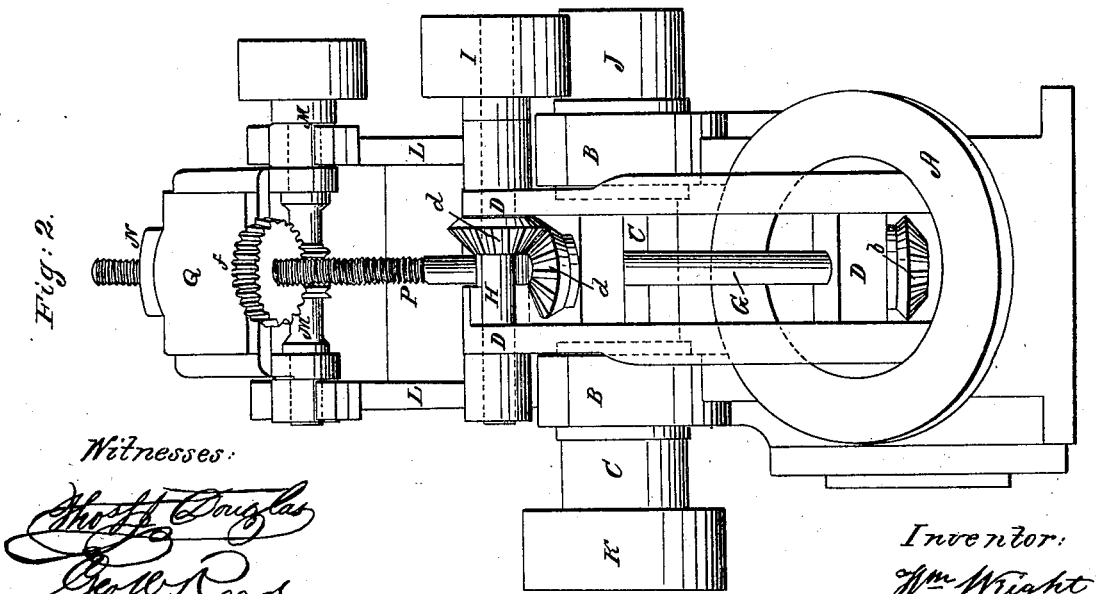
Witnesses:
Thos H Douglas
Geo W Reed
Inventor:
Wm Wright

UNITED STATES PATENT OFFICE.

WILLIAM WRIGHT, OF NEW YORK, N. Y.

IMPROVED MACHINE FOR BORING CURVED CYLINDERS.

Specification forming part of Letters Patent No. 42,616, dated May 3, 1864.

*To all whom it may concern:*

Be it known that I, WILLIAM WRIGHT, of the city, county, and State of New York, have invented new and improved machine for boring curved cylinders for steam-engines, and other purposes; and I do hereby declare that the following is a full, clear, and exact description of the same, reference being had to the accompanying drawings, in which—

Figure 1 is a vertical section of my boring-machine, showing it applied to a curved cylinder and in the act of boring the same. Fig. 2 is a front view of the same.

Similar letters of reference indicate corresponding parts in both figures.

The object of this invention is to produce bores having a circular transverse section and a true arc-formed longitudinal section.

It consists in the attachment of the cutter-stock and boring cutter to one or more curved arms, which are arranged to swing from a shaft arranged in stationary bearings concentric to the arc of the longitudinal section of the desired bore, and in obtaining a rotary motion of the cutter-stock by a belt and gearing or by gearing alone from the aforesaid shaft, and obtaining the feed of the said cutter-stock by a movement of its supporting arm or arms about the axis of the said shaft produced by a screw or other means.

To enable others skilled in the art to make and use my invention, I will proceed to describe its construction and operation.

The particular example of my invention represented in the drawings is for boring the longitudinally-curved cylinder A of a steam-engine, which has cast upon it or otherwise rigidly secured to it bearings B B, concentric with the arc of the longitudinal curvature of the cylinder, such bearings being intended for one of the shafts of the engine, but serving in the boring operation to receive the main shaft C of the boring-machine. For boring cylinders or curved bores, in cases where no such provision can be made for the support and working of the shaft C, the said shaft must have provided for it bearings in supports of suitable form, between which the cylinder or piece to be bored can be placed and secured in such position that the said shaft is concentric with the arc of its longitudinal curvature.

D is a strong cast-iron arm, which carries the rotary cutter-stock E, attached at one end to the shaft by the latter passing through it, and having at its other end the cutter-stock E, the shaft F of which is fitted to turn in a suitable bearing so arranged in the said arm that the plane of rotation of the point of the cutter *a* will be coincident with a plane passing through the axis of the main shaft C. The said arm D is of such curved form that it may pass into the bore of the cylinder and allow the cutter-stock to pass freely through it without obstruction.

G is a shaft arranged at or nearly at right angles to the shaft F of the cutter-stock in bearings in the arm D, the axis of the said shaft being in the same plane with the axis of the shaft F, and such plane being perpendicular to the axis of the main shaft C. This shaft is geared at one end by a pair of bevel-gears, $b$ $b$, with the shaft F, and at the other end by a pair of bevel-gears, $d$ $d$, with a shaft, H, which is arranged parallel with the main shaft C in suitable bearings in a portion of the arm D, which is not required to enter the bore. This shaft H, which is always at the same distance from the main shaft, is furnished with a pulley, I, to enable it to be driven by a belt, $e$, from a pulley, J, on the main shaft, but it may be geared with the main shaft by spur-gearing. The main shaft is also furnished with a pulley, K, to enable it to be driven by a belt from any suitable driving-shaft.

L is an open standard bolted to the end of the cylinder A, opposite to that at which the cutter-stock enters, for the support of the feed shaft M, which is parallel with the main shaft C, and of the socket Q, in which nut N of the feed-screw P works, said socket being attached to the feed-shaft M in such manner that it swings upon the said shaft. When an independent support is required for the bearings B B of the main shaft, the standard L may be erected upon the said support. The nut N is fitted to turn freely in the socket Q, and is furnished with a worm-gear, $f$, which gears with an endless screw-thread, $g$, on the feed-shaft, and the feed-shaft is driven by a belt from the main shaft, and so caused to give the nut a slow rotary motion in its socket, by which a longitudinal movement is given to the feed-screw P. This screw is attached by a pivot, $h$, to the arm D, and the movement of the screw about the axis of the pivot and the movement of the socket Q about the axis of the feed-shaft permit the feed-screw to adapt itself to the movement of the arm D about the axis of the main shaft, which is necessary in the boring of the cylinder, the latter movement being produced by the longitudinal movement of the feed-screw produced by the revolution of the nut N in the socket Q.

The operation of the machine is as follows: The feed-screw is first run up to its highest position by turning the shaft M, and the arm D thereby raised to its highest position before attaching the machine to the cylinder or placing the cylinder or other piece to be bored in the machine, and when the machine is attached or the cylinder or piece placed therein the cutter-stock is in a position to enter the cylinder. The machine is then set in operation by applying the necessary power to produce a rotary motion of the main shaft, and the arm D is moved in the direction of the arrow shown on it in Fig. 1 by the action of the feed-nut on the feed-screw, while the cutter-stock and cutter have a rotary motion imparted to them, and this operation is continued until the cutter-stock and cutter have passed entirely through the cylinder or other piece to be bored, and the boring has been completed. The machine is then stopped and the arm D, with the cutter stock and cutter, are drawn back by turning the feed-shaft more rapidly in the reverse direction, or by disconnecting the feed-screw and hauling back the arm D by power suitably applied, and the machine may then be detached from the cylinder or the cylinder or other piece which has been bored removed from the machine.

What I claim as my invention, and desire to secure by Letters Patent, is—

1. The combination of the main shaft C, the arm D, the cutter-stock E, and the gearing, or its equivalent, for driving the cutter-stock, the whole arranged and operating substantially as and for the purpose herein set forth.

2. The feed-screw P, nut N, swinging socket Q, and feed shaft M, the whole applied in combination with each other and with the arm D, to operate substantially as herein specified.

WM. WRIGHT.

Witnesses:
 THOS. L. J. DOUGLAS,
 M. M. LIVINGSTON.